UNITED STATES PATENT OFFICE.

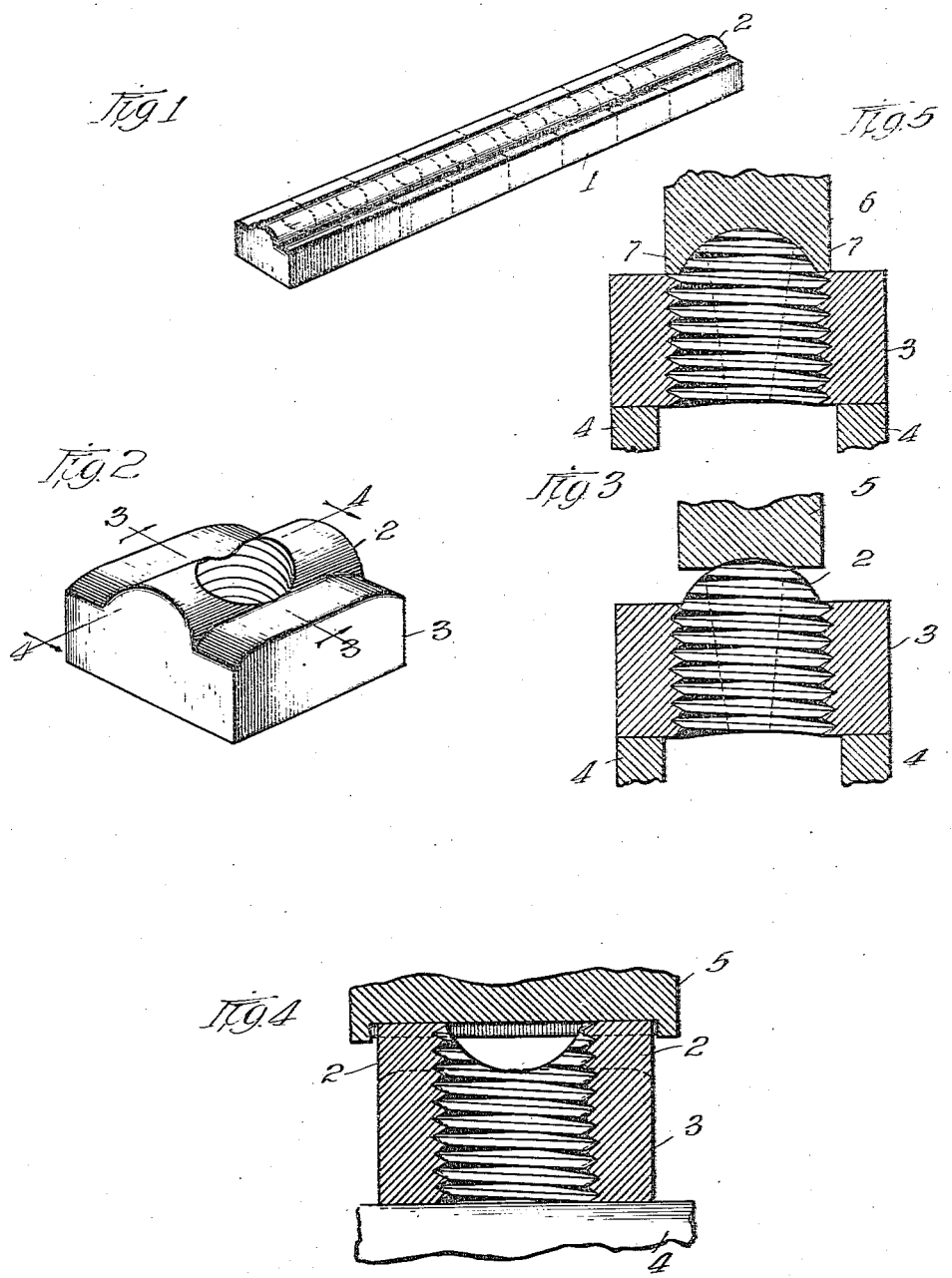

WILLIAM E. SHARP, OF CHICAGO, ILLINOIS, ASSIGNOR TO GRIP NUT COMPANY, OF CHICAGO, ILLINOIS, A CORPORATION OF ILLINOIS.

GRIP-NUT.

1,271,781.   Specification of Letters Patent.   Patented July 9, 1918.

Application filed March 29, 1915. Serial No. 17,682.

*To all whom it may concern:*

Be it known that I, WILLIAM E. SHARP, a citizen of the United States of America, residing at Chicago, in the county of Cook and State of Illinois, have invented certain new and useful Improvements in Grip-Nuts, of which the following is a description.

My invention belongs to that general class of grip or lock nuts, in which the thread in the nut is so modified that when the nut is screwed upon a coöperating bolt the parts so engage as not to be liable to accidental disengagement, even when subjected to vibration or jar.

The object of my invention is to produce a nut of the class described in a simple and economical manner, and that shall respond to the requirements and use of nuts of this character.

To this end my invention consists in the novel form and construction of the nut herein shown, and the process of forming the same.

In the drawings, wherein like reference characters indicate like or corresponding parts, Figure 1 is a perspective view of a suitable bar from which the nut may be formed;

Fig. 2 is a perspective view of the completed nut;

Fig. 3 is a section on line 3, 3 of Fig. 2,

Fig. 4 is a section on line 4, 4 of Fig. 2, and

Fig. 5 is a section similar to Fig. 3, with a modified form of compressing tool.

In the drawings, 1 represents a suitable bar from which the nut blanks may be cut, provided with a centrally disposed longitudinal bead 2 on one face thereof.

In this form the bolt holes may be punched and the nuts thereafter cut from the bar, as may be desired. Obviously, this is a preferred form, and the nut blank may be produced in other manners to secure a similar result.

After the nut is cut and suitably threaded the nut blank 3 is placed upon suitable supports 4, 4, spaced apart as indicated in Fig. 3, and extending parallel to the beaded portion shown. 5 is a suitable compressing tool or bar, which by any preferred mechanism may be forced downward upon the bead 2, while the nut is thus positioned upon the bars 4, the pressure being regulated to cause a slight bend throughout the nut in line with the bead and the pressure thereon. As thus constructed the threads through the nut in line with the bead will be slightly bent or deflected from their normal position, which will cause the nut to bind upon the threads upon a coöperating bolt upon which it may be placed.

It is obvious that in the drawings the deflection in the threads is exaggerated in order to clearly show the construction. As a matter of fact such deflection needs to be but very slight, and but a fractional part of the distance between the threads in the nut, to properly accomplish the results desired. In Fig. 5 is shown a modified form of compressing tool 6, designed to distribute the pressure to the body of the nut adjacent to the bead. This is accomplished by the tool spanning the bead with extensions 7, 7 resting on the body of the nut on each side of the bead.

It is also obvious that the form of the nut may be modified as desired, and that the nut may be either square or hexagonal, or otherwise.

It will be understood that where in the claim I refer to the nut having one substantially flat face, I do not intend to be limited to a nut having a strictly flat face, but a face that is flat in comparison with the beaded face on the other surface of the nut, the said flat face being adapted to form a firm bearing upon the proximate structure upon which the nut is used. If desired the blank may be slightly concave on the face opposite to the bead, as indicated in Figs. 3 and 5, so as to provide for any bending of the nut in that direction.

Having thus described my invention, what I claim as new and desire to secure by Letters Patent is:—

1. A bolt nut comprising a nut having one substantially flat face adapted to contact with the proximate structure in the usual manner and provided with a centrally disposed bead on the other face thereof interposed by the bolt hole, both the nut proper and the proximate bead being threaded and the bead being depressed in a line parallel to the axis of the bolt hole to slightly deflect the threads thereof.

2. A bolt nut comprising a nut having one substantially flat face adapted to contact with the proximate structure in the usual manner and provided with a centrally disposed bead on the other face thereof intersected by the bolt hole, both the nut proper and the proximate bead being threaded and the bead being depressed in a line parallel to the axis of the bolt hole to slightly deflect the threads of the bead, and of the proximate part of the body of the nut from their normal position.

In testimony whereof, I have hereunto signed my name in the presence of two subscribing witnesses.

WILLIAM E. SHARP.

Witnesses:
W. C. COOK,
S. S. SWASEY.